(12) United States Patent
Nichols et al.

(10) Patent No.: US 7,965,184 B1
(45) Date of Patent: Jun. 21, 2011

(54) CASH HANDLING FACILITY MANAGEMENT

(75) Inventors: Michelle Nichols, Rock Hill, SC (US);
Todd Atwood, Charlotte, NC (US);
James Heddleson, Charlotte, NC (US);
Felix Mon, Jacksonville, FL (US); Mark Waggoner, Keller, TX (US); Wallace Webster, Lynnwood, WA (US)

(73) Assignee: Bank of America Corporation, Charlotte, NC (US)

( * ) Notice: Subject to any disclaimer, the term of this patent is extended or adjusted under 35 U.S.C. 154(b) by 238 days.

(21) Appl. No.: 12/262,502

(22) Filed: Oct. 31, 2008

Related U.S. Application Data

(60) Provisional application No. 61/061,987, filed on Jun. 16, 2008.

(51) Int. Cl.
*G08B 13/14* (2006.01)
(52) U.S. Cl. .................................. 340/568.7; 340/572.1
(58) Field of Classification Search ............... 340/572.1, 340/572.4, 571, 568.1, 568.7, 505, 10.1, 340/10.3; 235/375, 379, 384; 705/65; 709/999.01
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 5,453,601 A * | 9/1995 | Rosen | 705/65 |
| 5,689,240 A | 11/1997 | Traxler | |
| 5,952,920 A | 9/1999 | Braddick | |
| 5,953,423 A * | 9/1999 | Rosen | 705/65 |
| 5,963,131 A | 10/1999 | D'Angelo et al. | |
| 6,047,807 A | 4/2000 | Molbak | |
| 6,122,625 A * | 9/2000 | Rosen | 705/65 |
| 6,483,433 B2 | 11/2002 | Moskowitz et al. | |
| 6,633,881 B2 * | 10/2003 | Drobish et al. | 1/1 |
| 6,736,314 B2 | 5/2004 | Cooper et al. | |
| 6,788,203 B1 | 9/2004 | Roxbury et al. | |
| 6,845,905 B2 | 1/2005 | Blad | |
| 7,042,360 B2 | 5/2006 | Light | |
| 7,212,992 B1 | 5/2007 | Kanevsky et al. | |
| 7,348,886 B2 * | 3/2008 | Himberger et al. | 340/572.1 |
| 7,375,638 B2 | 5/2008 | Light | |

(Continued)

FOREIGN PATENT DOCUMENTS

DE 4019265 C1 11/1991

(Continued)

OTHER PUBLICATIONS

Powerpoint Presentation, DTS Product Overview, IFS, Apr. 2006, 17 pages.

(Continued)

*Primary Examiner* — Van T. Trieu
(74) *Attorney, Agent, or Firm* — Banner & Witcoff, Ltd.; Michael Springs

(57) ABSTRACT

Cash handling facilities, such as cash vaults, receive and process large quantities of cash. The cash handling facility may have a plurality of custody points at which the amount of cash being processed is verified, counted, stored, or otherwise processed. Cash handling personnel that are handling the cash may be verified, detected, or otherwise documented as handling the cash. Automatic identification techniques may be implemented to track the cash and cash handling personnel at various custody points within the cash handling facility. A centralized tracking system may use the information obtained at each of the custody points to track, count, and verify the cash while it is located within the cash handling facility.

20 Claims, 5 Drawing Sheets

U.S. PATENT DOCUMENTS

| | | | |
|---|---|---|---|
| 7,474,217 B2 * | 1/2009 | Himberger et al. | 340/572.1 |
| 7,659,816 B2 | 2/2010 | Wandel | |
| 7,714,708 B2 | 5/2010 | Brackmann et al. | |
| 7,719,423 B2 * | 5/2010 | Himberger et al. | 340/572.1 |
| 7,748,610 B2 * | 7/2010 | Bell et al. | 235/379 |
| 2001/0054643 A1 | 12/2001 | Siemens | |
| 2002/0194122 A1 | 12/2002 | Knox et al. | |
| 2003/0011466 A1 | 1/2003 | Samuel et al. | |
| 2003/0050891 A1 | 3/2003 | Cohen | |
| 2003/0061153 A1 | 3/2003 | Birdsong et al. | |
| 2003/0122671 A1 | 7/2003 | Jeserpsen | |
| 2003/0208431 A1 | 11/2003 | Raynes et al. | |
| 2003/0234719 A1 | 12/2003 | Denison et al. | |
| 2004/0056767 A1 | 3/2004 | Porter | |
| 2004/0083149 A1 * | 4/2004 | Jones | 705/35 |
| 2004/0100379 A1 | 5/2004 | Boman et al. | |
| 2005/0091129 A1 | 4/2005 | Tien | |
| 2005/0108164 A1 | 5/2005 | Solafia, III et al. | |
| 2005/0183928 A1 | 8/2005 | Jones et al. | |
| 2005/0273347 A1 | 12/2005 | Dudley et al. | |
| 2006/0282277 A1 | 12/2006 | Ng | |
| 2007/0005452 A1 | 1/2007 | Klingenberg et al. | |
| 2007/0008118 A1 | 1/2007 | Kassiedass | |
| 2007/0012602 A1 | 1/2007 | Baldassari et al. | |
| 2007/0034693 A1 | 2/2007 | Jouvin et al. | |
| 2007/0063016 A1 | 3/2007 | Myatt et al. | |
| 2007/0226142 A1 | 9/2007 | Hanna et al. | |
| 2007/0282724 A1 | 12/2007 | Barnes | |
| 2008/0005019 A1 | 1/2008 | Hansen | |
| 2008/0103959 A1 | 5/2008 | Carroll et al. | |
| 2008/0149706 A1 | 6/2008 | Brown | |
| 2008/0199155 A1 | 8/2008 | Hagens et al. | |
| 2008/0223930 A1 | 9/2008 | Rolland et al. | |
| 2008/0262949 A1 | 10/2008 | Bond et al. | |
| 2008/0265019 A1 | 10/2008 | Artino et al. | |
| 2008/0303903 A1 | 12/2008 | Bentley et al. | |
| 2009/0006249 A1 | 1/2009 | Morgan et al. | |
| 2009/0006250 A1 | 1/2009 | Bixler et al. | |
| 2009/0032580 A1 | 2/2009 | Blachowicz et al. | |
| 2009/0051566 A1 | 2/2009 | Olsen et al. | |
| 2009/0051769 A1 | 2/2009 | Kuo et al. | |
| 2009/0164364 A1 | 6/2009 | Galit et al. | |
| 2009/0187482 A1 | 7/2009 | Blount et al. | |

FOREIGN PATENT DOCUMENTS

| | | |
|---|---|---|
| DE | 4429815 | 2/1996 |
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| WO | 99/33040 A | 7/1999 |
| WO | 03/034359 A | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl? id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

Non-Final Office mailed Mar. 8, 2010 issued in related U.S. Appl. No. 12/262,908.

Office Action from related U.S. Appl. No. 12/262,534 mailed Jun. 24, 2010 (17 pages).

Office Action from related U.S. Appl. No. 12/262,908 mailed Aug. 23, 2010 (12 pages).

Office Action from related U.S. Appl. No. 12/262,432 mailed Aug. 18, 2010 (12 pages).

International Search Report and Written Opinion from corresponding PCT Application No. PCT/US2009/047452 mailed on Aug. 25, 2009.

Non-Final Office mailed Mar. 12, 2010 issued in related U.S. Appl. No. 12/263,041.

Office Action from U.S. Appl. No. 12/263,041, mailed Sep. 2, 2010.

Office Action from related U.S. Appl. No. 12/262,448 mailed Sep. 15, 2010, pp. 1-18.

Office Action from related U.S. Appl. No. 12/262,526 mailed Sep. 16, 2010, pp. 1-12.

Office Action from U.S. Appl. No. 12/263,401, mailed Jan. 26, 2011.

Non-Final Office Action in U.S. Appl. No. 12/262,523 dated Nov. 9, 2010.

Final Office Action in U.S. Appl. No. 12/262,526 dated Nov. 23, 2010.

Non-Final Office Action in U.S. Appl. No. 12/262,928 dated Nov. 10, 2010.

Non-Final Office Action in U.S. Appl. No. 12/263,115 dated Nov. 16, 2010.

Non-Final Office Action in U.S. Appl. No. 12/262,532 dated Nov. 26, 2010.

Non-Final Office Action in U.S. Appl. No. 12/262,472 dated Oct. 18, 2010.

Non-Final Office Action in U.S. Appl. No. 12/262,534 dated Oct. 14, 2010.

European Search Report in EP09007879 dated Oct. 1, 2009.

European Search Report in EP09007878 dated Oct. 1, 2009.

Final Office Action in U.S. Appl. No. 12/262,908 dated Aug. 18, 2010.

Non-Final Office Action mailed Feb. 3, 2011 issued in related U.S. Appl. No. 12/262,522.

* cited by examiner

CASH HANDLING FACILITY MANAGEMENT

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of automatic teller machines (ATMs), cash handling facilities, banking centers, and cash recyclers. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client site to the cash handling facility and potentially on to proof and bulk file. Proof and bulk file is the verification and storage of checks or other negotiable and non-negotiable instruments. Deposit bags are handled multiple times in the process, which increases potential errors, opportunity for theft, and complicates finding missing transactions. Pertinent pieces of deposit data are typically manually entered and reentered into front-end systems throughout the end-to-end process. This lack of visibility into the end-to-end deposit and cash servicing capabilities restricts the ability to offer clients useful services as well as a bank's opportunities to be a differentiator in the market place.

Typically, deposit bags arrive at a cash handling facility and the cash, checks, or other monetary packages are counted by hand, and then reconciled with a paper ledger provided by the armored carrier. The armored carrier must wait until the manual count of the deposit bags matches the paper ledger and all errors are reconciled. Only after the deposit bags are reconciled with the paper ledger, may the deposit bags be assigned to a teller for counting, inspection, and/or redistribution. Deposit bags are manually assigned to tellers and workflow is managed based upon a human manager making subjective decisions regarding a particular teller's workflow capacity. The teller must take each deposit bag to a teller station and manually enter the declared amounts of cash and negotiable instruments that are present in the deposit bag before the teller is allowed to begin verifying the cash. Once the teller verifies the cash, the cash is taken to a sorter room for sorting, and then it is strapped. Strapped physical cash is stored within the cash handling facility. This entire process is expensive, time-consuming, and prone to errors.

Only a particular group of authorized people are allowed to handle the cash within the cash handling facility. However, it is possible for unauthorized people gain access to the cash handling facility. Such breaches of security can lead to thefts and mishandling of the cash. The personnel that handle the cash are responsible for securing a custody transfer of the cash, which must be closely monitored. The present system is performed manually, which is inefficient and error prone.

Advancements in the art of cash handling facility management that would increase efficiency, decrease errors, and decrease costs would be welcomed.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential theft, fraud or embezzlement, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed cash package) may be recognized much earlier, even prior to actual deposit or arrival of the package at the processing site.

Another potential benefit of centralized cash package tracking may include improved cash handling facility management. Within a cash handling facility, the cash is transferred along a processing route that may include a plurality of custody points. The custody points may be any points of security, cash handling, counting, strapping, storing, or the like that the cash undergoes while it is physically present in the cash handling facility. The custody points may also include a person or group of people that handle the cash. Any physical location within a transfer of custody would define a custody point.

Identification tags may be attached to any of the items and to any personnel involved in the cash handling facility process, which provides for detailed and accurate tracking of the location of the cash and the movement of cash within the cash handling facility. The centralized tracking system may receive information relating to the item at each custody point in the cash handling facility. Such information may be used to quickly verify that cash is present at a particular location and may assist the personnel in quickly verifying the contents of a deposit bag.

At many points of custody within the cash handling facility, a verification process occurs in which a paper or electronic ledger describing the contents of the bag is reconciled with the actual contents of the bag. The verification process may be handled by a person or a mechanical or electro-mechanical device, such as a scale, a smart cart, a smart table, a cash recycler, a cash tray, a cash strap, and any other device that may be involved with the cash while it is in the cash handling facility.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
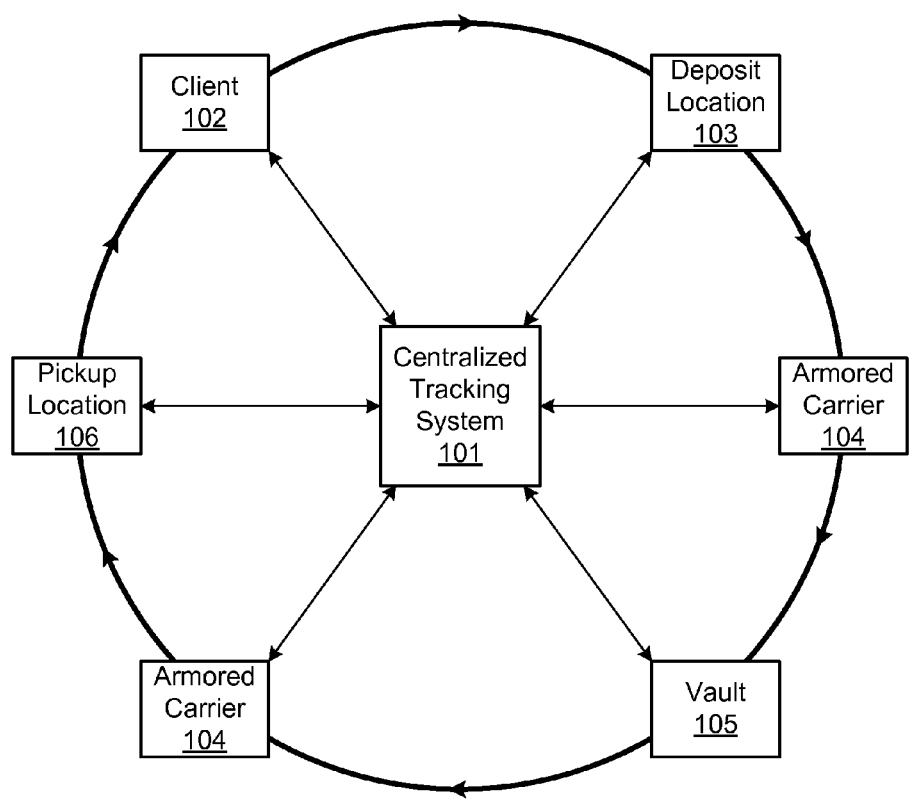
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104*a*/104*b* (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
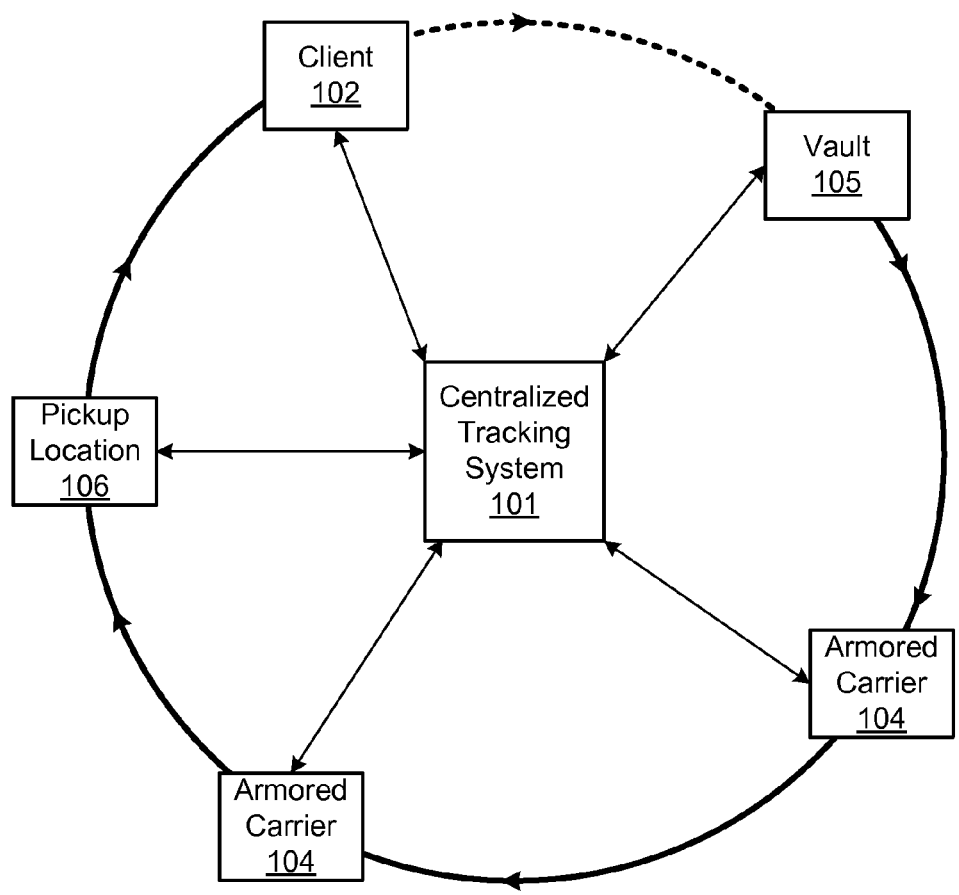
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
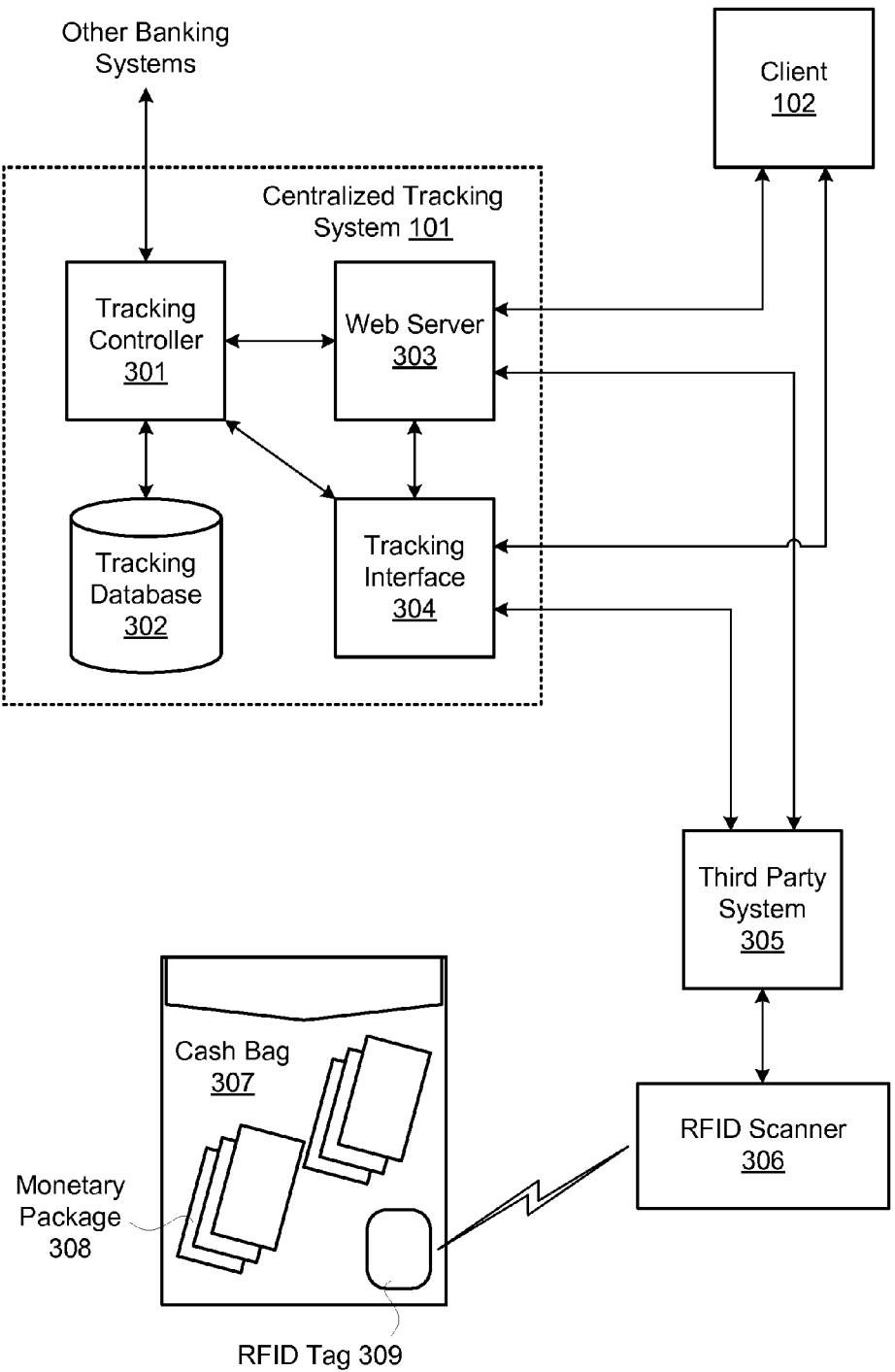
FIG. 3 is a functional block diagram of an illustrative cash package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
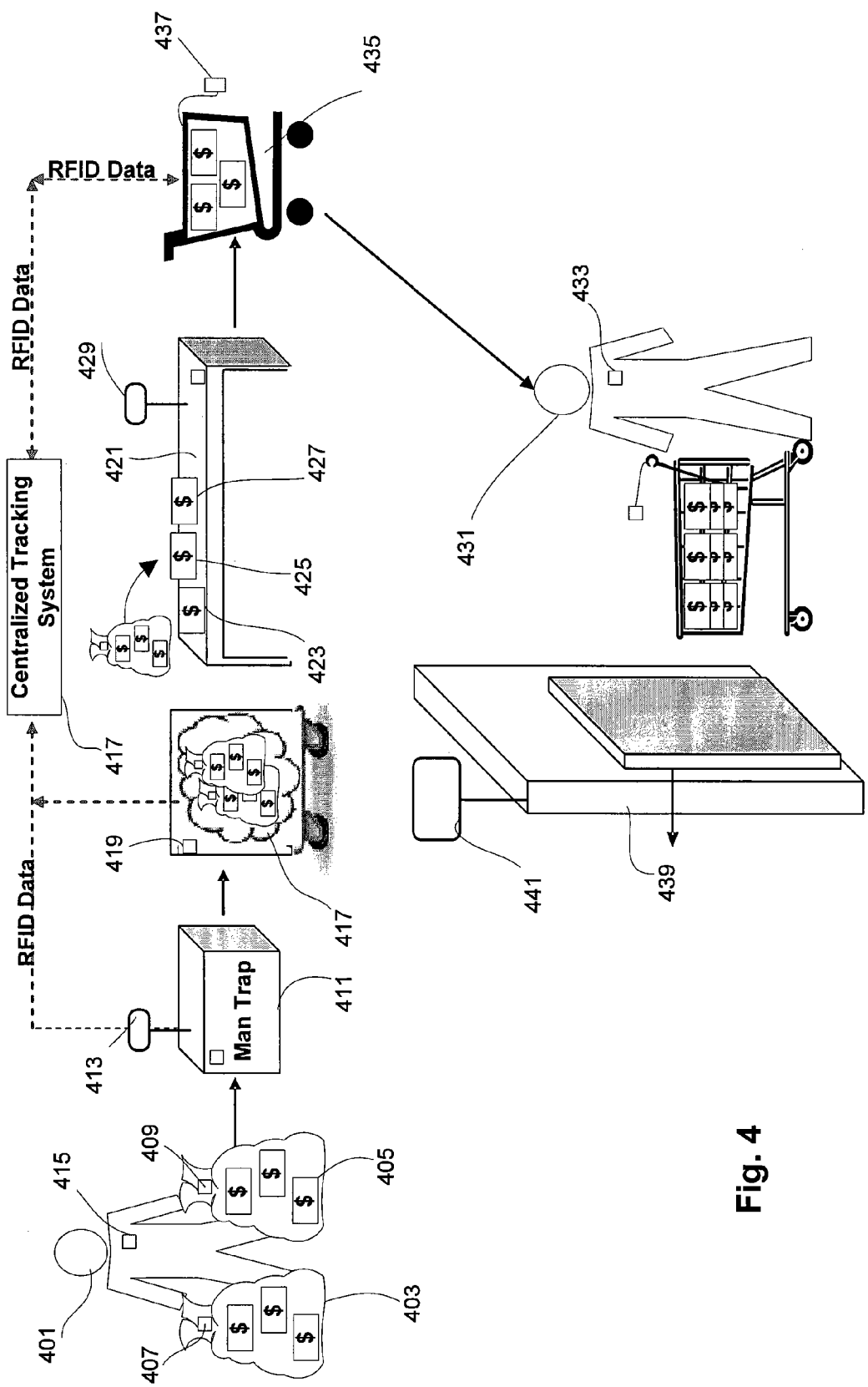
FIG. 4 is an illustrative transfer of custody process for cash within a cash handling facility.

FIG. 4 depicts an illustrative process of a cash movement within a cash handling facility. The cash handling facility may be a cash vault or any other location at which cash transfers custody from a first location to a second location. A custody transfer occurs any time cash is moved from a first location to a second location. Various equipment and/or personnel may be involved in the custody transfer and any information about the custody transfers may be documented. The central tracking system, such as central tracking system 101 described above, may implement an RFID tracking system that automatically identifies items at various locations. As applied to the cash handling facility scenario, RFID tags may be attached to one or more items that arrive at or are located within the cash handling facility. RFID scanners may detect the presence of the RFID tags at a particular location and record the location of the item to which the RFID tag is attached. Such items may be deposit bags, cash bags, cash straps, personnel, man traps, cash trays, smart carts, smart tables, and any other suitable item located at the cash handling facility.

In FIG. 4, armored carrier personnel 401 may arrive at the cash handling facility to deliver a first deposit bag 403 containing cash and a second deposit bag 405, which also contains cash. A first RFID tag 407 may be attached to the first deposit bag 403 and a second RFID tag 409 may be attached to the second deposit bag 405. The armored carrier personnel 401 may conduct a custody transfer by physically moving the first deposit bag 403 and the second deposit bag 405 into a man trap 411. Any carrier may be responsible for transportation of the monetary packages and/or transferring the monetary packages from a first custody point to a second custody point. This could include manual and/or automatic transfers performed by a human or a machine.

The man trap 411 may be the receiving point at the cash handling facility. In some examples, the man trap 411 serves as a secure deposit point for the armored carrier to deliver the cash packages. An RFID scanner 413 positioned at or near the man trap 411 may detect a first signal containing information from the first RFID tag 407 and a second signal containing information from the second RFID tag 409. The RFID scanner 413 may also detect a signal from an RFID tag 415 attached to the armored carrier personnel 401.

Generally, an RFID signal may include information such as a unique identifier (e.g., alphanumeric text or a name), information about the contents of the item to which the RFID tag is attached (e.g., the quantity of cash, denomination of cash, etc.), information about the source of the item or the sender of the item, and any other characteristics of the item. The information transmitted in the signals may be tracked by the centralized tracking system 417.

The contents of each of the first deposit bag 403 and the second deposit bag 405 may be physically transferred to the man trap 411. The man trap 411 may serve as a secure custody transfer between the armored carrier personnel 401 and the cash handling facility. Custody of the first deposit bag 403 and the second deposit bag 405 may be transferred from the man trap 411 to a smart cart 417 equipped with an RFID tag 419. A smart cart 417 may be a cart that is equipped with sensors for detecting the contents of cash that are physically placed on the cart. For example, a smart cart 417 may be equipped with a pressure or force sensor and may be able to detect the weight on the physical cash, which may correspond with a particular dollar amount of the physical cash. The smart cart 417 may also have an RFID scanner that detects the presence of the RFID tags attached to a cash package placed on the smart cart 417. As described below, the RFID tags may send a signal to an RFID scanner that describes the contents of the item to which the RFID tag is attached.

A smart cart signal may be transmitted from the RFID tag 419. The smart cart 417 may analyze the contents of the first deposit bag 403 and the second deposit bag 405 and calculate the amount of cash that is contained within the first deposit bag 403 and the second deposit bag 405. This amount is communicated to the centralized tracking system 417. In some arrangements, the amount is also reconciled with the amount determined by the armored carrier 401 and/or the man trap 411. Some or all of this information is communicated to the centralized tracking system 417.

The first deposit bag 403 may be assigned to a first teller (not shown) at a first teller station 421. The first teller station 421 may be a smart table having an RFID tag as illustrated in FIG. 4. Similar to the smart cart 417 described above, the smart table may have a one or more sensors that detect characteristics about the items that are place on the smart table. For example, a pressure or force sensor may detect the weight of an item placed on the smart table, which may correspond to a particular amount of physical cash contained in the item. The smart table may also contain an RFID scanner that detects the presence of RFID tags attached to items containing cash, as described below.

The cash contents of the first deposit bag 403 are removed and placed on the smart table by the teller. The cash contents may be divided into one or more cash packages including a first cash package 423, a second cash package 425, and a third cash package 427. Each of the cash packages may have an RFID tag associated with it that is read by an RFID scanner 429. A signal is transmitted from the cash packages to the RFID scanner 429 containing information regarding the contents of the cash packages to the centralized tracking system 417. The teller may count the contents of each of the cash packages 423, 425, 427 and determine an amount of cash contained in each of the cash packages 423, 425, 427. These amounts are reconciled with the amount of the first deposit bag 403 that is determined by the armored carrier 401, the man trap 411, and/or the smart cart 417. In some examples, a paper or electronic ledger accompanies the cash packages as it is transported between custody points within the cash handling facility.

A second teller 431 equipped with an RFID tag 433 may be responsible for physically transferring the contents of the first cash package 423, the second cash package 425, and the third cash package 427 from the first teller station 421 to another smart cart 435 equipped with an RFID tag 437. This smart cart 435 may transmit an RFID signal to the centralized tracking system 417 that verifies the presence of the cash within the smart cart 435. The second teller 431 may arrive at the cash vault 439 into which the cash is transferred for storage. The presence and/or amount of the cash may once again be verified after the second teller 431 has secured the storage of the cash within the cash vault. A cash vault RFID scanner 441 detects the second teller 431 and/or the cash packages 423, 425, 427 and/or smart cart 435, which may provide yet another verification process of the contents of the cash packages. Further, the cash vault RFID scanner 441 also verifies the identity of the second teller by the identifying information transmitted from the second teller's RFID tag 433 and permits the second teller 431 entrance to the cash vault 439. The cash vault's RFID scanner 441 may only permit authorized personnel to enter the cash vault 439.

In some arrangements, access to the cash vault 439 may also require input of a user identification number, password, biometric data, etc. For instance, in order to gain access to the cash vault 439, second teller 431 may input a unique identification number, such as an employee number, password, etc. or submit to an iris scan, fingerprint scan, voice recognition scan, or other verification process. This additional user information may add an additional layer of security to ensure that only authorized personnel gain access to the cash vault 439. At each point that the RFID scanners within the cash handling facility receive information about the location of the cash or personnel or the contents of the cash packages, an electronic signal may be transmitted to the centralized tracking system to document these actions, verify that the actions are correct, and to authorize personnel to handle the cash at various custody points.

At each custody point within the cash handling facility, the action performed and personnel handling the cash may be transmitted in an electronic signal via an RFID system that is in communication with a computing system that hosts the centralized tracking system 417. The centralized tracking system 417 may be able to track the cash through each step along the intake process at the cash handling facility. Further, the amount of the cash may be verified at each step and each person or other custodian or machine that handles the cash may be documented.

The term "verification" may mean counting the cash to verify that the amount of cash that is present in each of the deposit bags matches the amount of cash that is purported to be present in each of the deposit bags by the armored carrier personnel 401 or at any previous custody point in the cash handling facility process. The transfer of the deposit bags and/or the cash packages between custody points are physically moved between the custody points by a custodian. A custodian may be a person, such as an armored carrier personnel, or a device, such as a smart cart or man trap.

Figure 5:
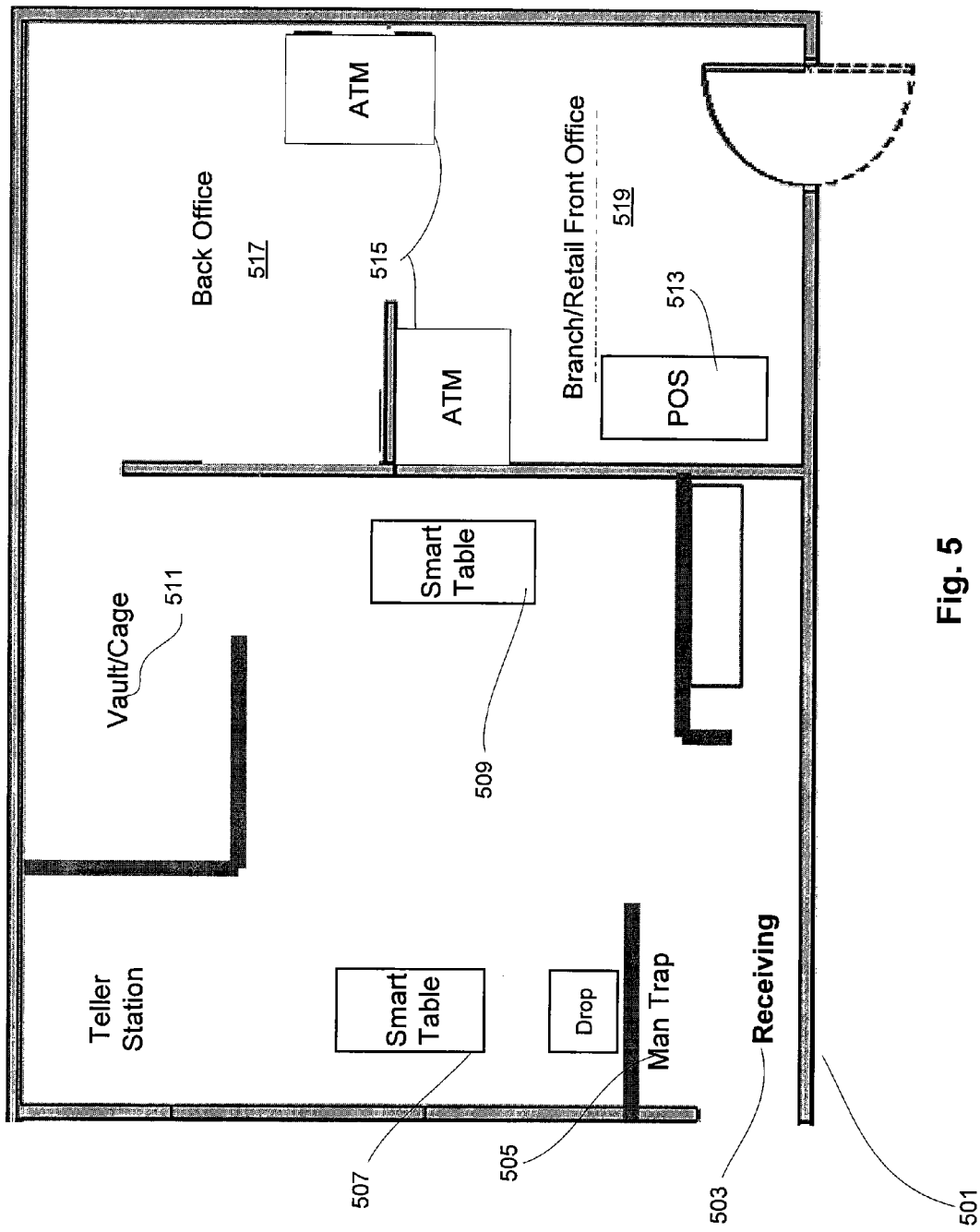
FIG. 5 is an illustrative cash handling facility having a plurality of custody points.

FIG. 5 illustrates another example cash handling facility 501. The cash handling facility 501 may have a plurality of custody points including a receiving area 503, a man trap 505, a first smart table 507, a second smart table 509, and a cash vault 511. The cash handling facility 501 may also include a point of sale 513, one or more automated teller machines 515, office space 517, and/or other retail space 519. An RFID tracking system may be implemented within the cash handling facility 501 that includes a plurality of RFID tags attached to each of the custody points and to any person (not shown) who handles the cash.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

The system described above may also be implemented in any facility that handles any monetary packages, including cash, coin, checks, coupons, food stamps, negotiable instruments, and any other monetary instrument. The processing and tracking information gathered may also be compared to in-transit records (e.g., the contents of monetary packages being transported in real-time by carriers). Such information may be manually or automatically reconciled. This comparison may also permit re-routing of carriers so that the monetary packages may be re-routed while the transport is occurring, if a request comes in that may be met by the contents of the monetary packages being transported by the carriers. In essence, the monetary packages being transported may also be used to fill change order requests and other cash handling needs because such monetary packages are being tracked.

While the invention has been described with respect to specific examples, those skilled in the art will appreciate that there are numerous variations and permutations of the above described systems and methods. Thus, the spirit and scope of the invention should be construed broadly as set forth in the appended claims.

We claim:

1. A method of handling cash within a cash handling facility, comprising the steps of:
   identifying a first custody point and a second custody point within the cash handling facility;
   automatically identifying an item located at the first custody point;
   while the item is physically present at the first custody point, determining a first quantity of cash that is associated with the item;
   transferring the item from the first custody point to the second custody point;
   automatically identifying the item at the second custody point;
   while the item is physically present at the second custody point, determining a second quantity of cash that is associated with the item;
   verifying that the first quantity of cash is the same as the second quantity of cash.

2. The method recited in claim 1, further comprising the step of transferring the item from the second custody point to a third custody point.

3. The method recited in claim 1, wherein the step of transferring the item is performed by a cash handling facility personnel.

4. The method recited in claim 3, wherein a radio-frequency identification (RFID) tag is attached to the cash handling facility personnel and the cash handling facility personnel is automatically identified at least one of the first custody point and the second custody point.

5. The method recited in claim 1, wherein the step of automatically identifying the item comprises identifying the item based on an identifier transmitted by a radio-frequency identification (RFID) tag attached to the item.

6. The method recited in claim 1, wherein the item is a cash bag.

7. The method recited in claim 1, wherein the item is a cash strap.

8. The method recited in claim 1, wherein the custody point is within a cash handling facility.

9. The method recited in claim 1, wherein the custody point is at least one of a cash tray, a smart table, a smart cart, a cash strap, an armored carrier, and a cash handling personnel.

10. A cash handling facility management system, comprising:
   a plurality of custody points including at least a first custody point and a second custody point;
   at least one cash containing device that is transferred from the first custody point to the second custody point;
   an automatic identification system having:
      a plurality of scanners including at least a first scanner positioned at the first custody point and a second scanner positioned at the second custody point; and
      a plurality of tags including at least a first tag attached to the at least one cash containing device;
      wherein the first scanner detects a presence of the cash containing device when the cash containing device is located at the first custody point and the second scanner detects the presence of the cash containing device when the cash containing device is located at the second custody point;
   a memory for storing:
      tracking information related to the first scanner's detection that the at least one cash containing device is present at the first custody point and/or the second scanner's detection that the at least one cash containing device is present at the second custody point;
      information related to an amount of cash associated with the cash containing device at the first custody point;
      information related to the amount of cash associated with the cash containing device at the second custody point; and
   a processor configured to determine when the information related to the amount of cash associated with the cash containing device at the first custody point is equal to the information related to the amount of cash associated with the cash containing device at the second custody point.

11. The system recited in claim 10, wherein the first custody point is a receiving area and the second custody point is a man trap.

12. The system recited in claim 10, wherein the first custody point is a man trap and the second custody point is a smart cart.

13. The system recited in claim 10, wherein the automatic identification system is a radio-frequency identification system (RFID), the plurality of readers are RFID scanners, and the plurality of tags are RFID tags.

14. The system recited in claim 10, wherein the cash containing device is a deposit bag containing a plurality of cash bags, wherein the first tag is attached to the deposit bag and a second tag is attached to at least one of the cash bags.

15. A method of transferring custody of cash within a cash handling facility, comprising the steps of:
   identifying an cash containing device;
   attaching a radio-frequency identification (RFID) tag to the cash containing device, wherein the RFID tag contains information describing an amount of cash contained in the cash containing device and a unique identifier associated with the cash containing device;
   receiving the cash containing device at a receiving point of a cash handling facility having an RFID scanner;
   transmitting a signal from the RFID tag to the RFID scanner, that the signal including information about the cash and the unique identifier;
   transferring the cash containing device from the receiving point to a first custody point within the cash handling facility;
   counting the cash associated with the cash containing device at the first custody point;
   comparing the amount of cash that is counted at the receiving point with the amount of cash that is counted at the first custody point; and
   if the amount of cash counted at the receiving point equals the amount of cash counted at the first custody point, transferring the cash containing device from the first custody point to a second custody point.

16. The method recited in claim 15, wherein the cash containing device is a deposit bag containing at least one of a cash bag and a cash strap containing at least one of physical cash and negotiable instruments.

17. The method recited in claim 15, wherein the information about the cash includes an amount of physical cash that is contained in the cash containing device.

18. The method recited in claim 17, wherein the step of transferring the cash containing device from a first custody point to a second custody point is performed by a cash handling personnel having an RFID tag attached thereon, wherein the physical location of the cash handling personnel is tracked by the detected of the RFID tag by at least one of the RFID scanners.

19. A method of handling cash at a cash handling facility, comprising the steps of:
   receiving, at a central tracking system, identification of a first custody point;
   receiving, at the central tracking system, identification of a cash containing device located at the first custody point;
   determining an a first amount of cash contained with the cash containing device at the first custody point;
   receiving, at the central tracking system, identification of a second custody point
   transferring the cash containing device to from the first custody point to the second custody point;
   receiving, at the central tracking system, identification of the cash containing device located at the second custody point;
   determining a second amount of cash contained within the cash containing device located at the second custody point; and
   verifying that the first amount of cash and the second amount of cash are the same.

20. The method recited in claim 19, wherein the step of receiving identification at the first custody point and the second custody point is performed by an RFID system.

* * * * *

UNITED STATES PATENT AND TRADEMARK OFFICE
CERTIFICATE OF CORRECTION

| | | |
|---|---|---|
| PATENT NO. | : 7,965,184 B1 | Page 1 of 1 |
| APPLICATION NO. | : 12/262502 | |
| DATED | : June 21, 2011 | |
| INVENTOR(S) | : Nichols et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Column 12, Claim 15, Line 5:
    Please delete "an" and insert -- a --

Column 12, Claim 19, Line 46:
    Please delete "an"

Column 12, Claim 19, Line 50:
    Please delete "to"

Signed and Sealed this
Twenty-fifth Day of October, 2011

David J. Kappos
*Director of the United States Patent and Trademark Office*